Dec. 31, 1963        J. H. OTT        3,115,960
FRUIT PICKER'S FRUIT GATHERING CHUTE
Filed April 14, 1961
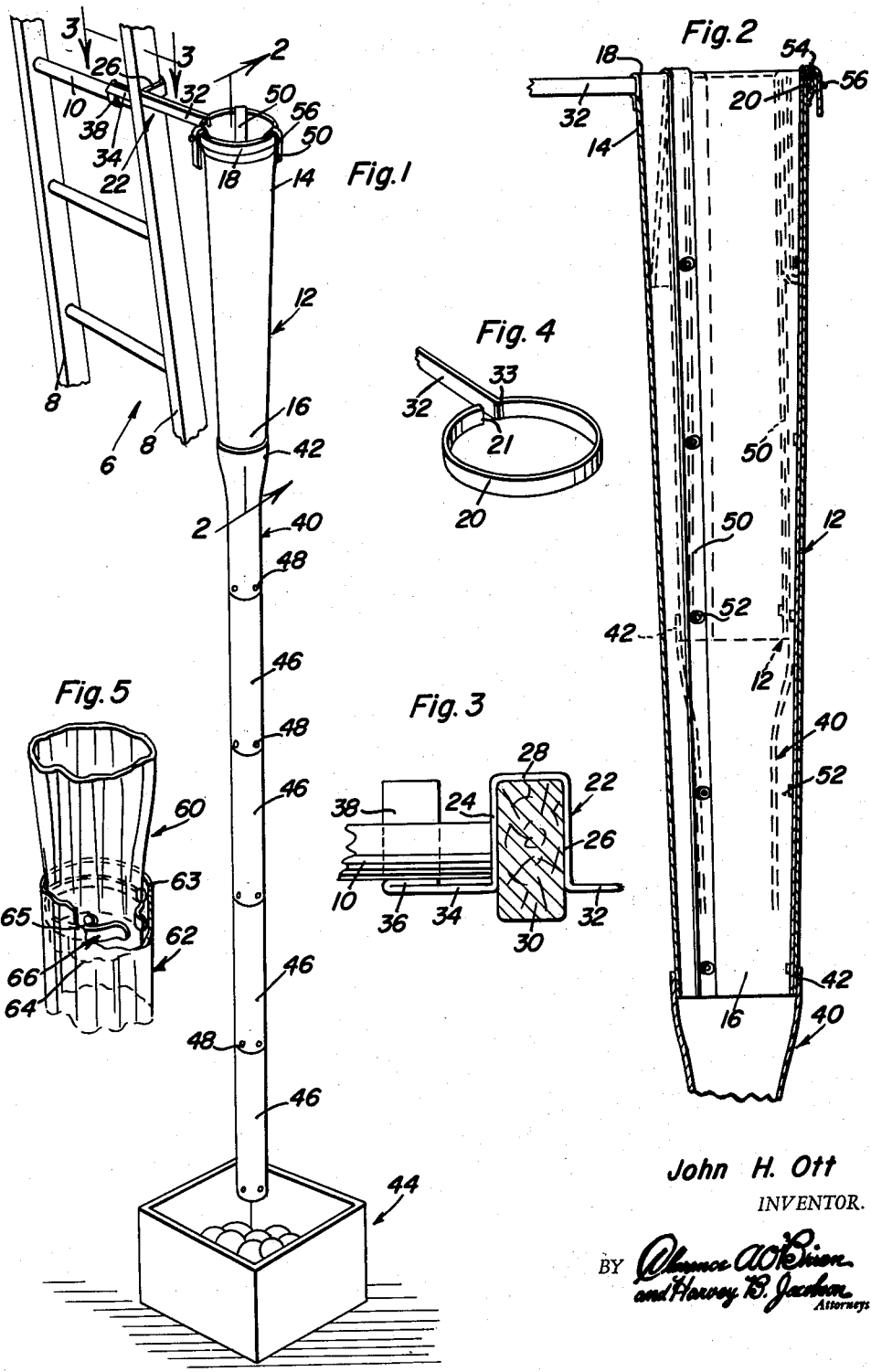
John H. Ott
INVENTOR.

3,115,960
FRUIT PICKER'S FRUIT GATHERING CHUTE
John H. Ott, 2601 River Road, Manasquan, N.J.
Filed Apr. 14, 1961, Ser. No. 103,131
7 Claims. (Cl. 193—7)

This invention relates to certain new and useful improvements in portable manually usable means which is expressly constructed and suitably assembled to greatly benefit and helpfully aid a fruit picker while hand-picking fruit from the limbs of a fruit tree, and has to do with a picker's ladder, an improved gathering chute, and novel means for detachably and adjustably mounting the chute on the ladder.

A significant object of this invention is to structurally, functionally and in other ways improve upon prior art fruit gathering and conducting chutes and, in so doing, to advance the art. Also, and as a result of the means herein disclosed and employed, fruit pickers can save valuable time and labor and accomplish what cannot be done when resorting to and following prevailing procedures and practices.

One aspect of the overall concept pertains to the complete ready-to-use assemblage; namely, a fruit picker's ladder, the improved fruit trapping and gravitating chute and the means for detachably and adjustably suspending the upper end of the chute from the ladder. More particularly this combination comprehends a fruit picker's ladder having vertical spaced parallel side rails and horizontal rungs fixed horizontally between said rails, a vertically elongated fruit gathering and gravity delivering chute situated alongside one rail, and means for detachably and adjustably connecting said chute to said ladder, said means comprising a hoop with which the upper intake end of the chute is aligned and to which it is connected and from which it is suspended, and an attaching bracket carried by said hoop and radiating therefrom and having component portions connected to one rail and a predetermined rung, whereby the chute and said means may be readily adjusted on the ladder to adapt same to the picker's standing but ever changing positions on the ladder rungs.

Another improvement comprehends the adoption and use of a novel device or bracket which serves as means for detachably and adjustably connecting the chute to the ladder. In addition to the hoop this means embodies a U-bend embracing and gripping said one rail, a first arm connecting one limb of the U-bend to said hoop, and a second arm connected with the other limb of the U-bend and terminating in a suitably offset lateral hook connectible with the cooperating rung.

Somewhat more specifically a significant improvement is the novelly constructed bracket. This bracket embodies a U-shaped bend for attachment to a side rail of a fruit picker's ladder, said bend having spaced parallel limbs and a bight portion connecting the limbs together, a chute suspending hoop, a first arm joined at one end to and radiating from the loop and joined at the other end to one of said limbs, a second arm coplanar with the first arm and joined to the other limb, said second arm terminating in a ladder rung engaging and retaining hook.

More explicitly a highly important phase of the concept relates to the fruit gathering and delivering chute by itself. This is believed to be novel in that it is characterized by a funnel-like downwardly tapering upper section having an open mouth at its top, the cross-sectional diameter of the lower end of said upper section being greater than the size of the fruit which must pass freely therethrough and at least one lower section companion section having an upper end joined communicatively to said lower end, said upper section being flexible but inelastic, said lower section being elastic and of a uniform cross-sectional diameter slightly less than the size of the fruit so that it functions to arrest the fall of the fruit through the upper section yet allows the fruit to gravitate and descend slowly to and through the bottom discharge end thereof to avoid damaging the fruit.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective showing the complete ready-to-use assemblage; namely, the ladder, the chute, the means bracketing the upper end of the chute to the ladder and the fruit receiving box or other container;

FIGURE 2 is an exaggerated view taken on the vertical line 2—2 of FIGURE 1, looking in the direction of the arrows;

FIGURE 3 is an enlarged fragmentary view in section and elevation taken on the horizontal line 3—3 of FIGURE 1;

FIGURE 4 is a fragmentary view in perspective which serves to show the opening in the hoop; and FIGURE 5 is a fragmentary view in perspective which illustrates a feature not seen in the other figures, namely, a resilient contracting clip.

With reference to FIGURE 1 the ladder is denoted by the numeral 6 and is of ordinary construction and comprises vertical spaced parallel rails or stiles 8 and intervening horizontal steps or rungs 10. The fruit depositing and gathering chute is made up of a plurality of component aligned separably connectible parts. The first part therein distinguished as the upper section is denoted by the numeral 12 and comprises a downwardly tapering flexible funnel-like sleeve or tube. The sleeve is preferably made of a suitable grade of canvas or duck. The upper larger end portion 14 constitutes the intake mouth and the lower tapering end portion provides a discharge neck 16. In practice this section 12 may be some five feet more or less in length. The upper end is fashioned into a suitable hem 18 which as shown in FIGURE 2 encloses and contains a rigid metal ring or suspension hoop 20. This hoop is a component of the attaching means and this "attaching means" is preferably of the specific construction illustrated. A significant part of the means comprises a readily attachable and detachable bracket 22 which as shown in FIGURE 3 is made from a suitable grade of strap metal and embodies a U-shaped portion which in turn embodies a pair of spaced parallel limbs 24 and 26 connected by a bight portion 28. This U-bend forms a hoop and bracket stabilizing grip and embraces the rail 30. The arm 32 which is connected to the right limb 26 is in turn connected to and supports the hoop 20. The complemental coplanar arm 34 is carried by the limb 24 and terminates in a return bend 36 fashioned into a suitable hook 28 which engages beneath and around the rung of the ladder in the manner shown in FIGURE 1. With this type of attaching means it will be evident that the upper section or sleeve 12 may be positioned at the desired level depending on where the fruit picker is standing to attend to his picking activity. In other words with this novel hoop-equipped construction the suspended chute can be raised and lowered as a unit which makes the ladder 6, the chute 12 and the bracket means 22 a novel assemblage in a combination sense.

The lower section of the gathering chute is preferably in the form of an adjustable conduit. Actually this section is made up of a plurality of companion selectively usable sections. For convenience of description the uppermost component will be referred to as a lower section 40. It comprises an elastic rubber or an equivalent tube which is of slightly smaller diameter than the fruit which is to be picked. However, the upper end portion 42 is stretched over the lower end of the upper section as illustrated in FIGURES 1 and 2 and suitably connected thereto. The neck or lowermost end 16 of the upper section is of a cross-sectional diameter greater than the size of the fruit to be deposited in the box or other collecting container 44. The invention has been constructed to satisfactorily facilitate expedient picking of such fruits as apples, oranges, lemons, grapefruit and so on. It follows that the chute considered as an entity will vary in construction depending on the nature and size of the fruit which is to be allowed to descend therethrough into the box 44. The auxiliary elastic sleeves or tubes carried by the already mentioned tube 40 are conveniently referred to here by the numeral 46 and they may be of suitable length and prerequisite cross-sectional diameter. The adjacent ends of these elastic auxiliary tubes will be separably connected by buttons or equivalent quick connectible fasteners 48.

Attention is directed to FIGURE 2 wherein it will be seen that several or more elongated tapes or straps 50 are provided and these have longitudinally spaced fasteners 52 connectible with companion fasteners (not detailed) on the interior surface of the funnel-like upper section 12. The upper ends 54 of the straps may be bent or folded over the hem 18 and then secured separably to exterior fasteners 56 thereon. This arrangement of pull-up suspension straps and fasteners permits the upper tube or section 12 to be shortened and lengthened as desired.

Referring with particularity to FIGURE 4 it will be evident that the purpose of this figure is to bring out a structural detail which is not clearly apparent in either FIGS. 1 or 2. The arm portion 32 of the aforementioned bracket has an end 33 which is joined to a cooperating end portion of the hoop. The hoop is of split construction and the free or terminal end 21 is spaced from the junctional connection 33 and this construction is preferred to facilitate applying the hem at the top of the chute to the hoop. Any other equivalent construction to facilitate attaching the hem to the hoop would be within the purview of the instant concept.

Referring now to FIGURE 5 a slight modification in the construction is shown. The purpose here is to regulate the size of the chute or passage of the chute in relation to the particular fruit which is to be passed therethrough. The numeral 60 designates a sleeve or tube constituting a section of the chute and the companion sleeve or tube section is denoted at 62. The telescoping ends 63 and 64 are separably connected together by snap fasteners or other equivalent connecting means 65. Interposed between the ends 63 and 64 is a split expansible and contractible clip or collar 66. Specifically this collar is like a so-called trousers guard used by bicycle riders. In fact by employing a gentle spring of requisite tension the coacting ends could be reduced in cross-section to insure optimum safe passage of the downwardly passing fruit. The clips would come in several sizes permitting greater flexibility with the same size tube.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on, a conventional-type fruit picker's ladder having vertical spaced parallel side rails and horizontal rungs fixed horizontally between said rails; a vertically elongated fruit gathering and gravity delivering chute adapted to be situated alongside one of said rails with its upper intake end available to the picker, and means for detachably and adjustably connecting the upper end of said chute to said ladder, said means comprising a hoop with which the upper intake end is cooperatively aligned and to which it is connected and from which it is suspended, and a chute offsetting and attaching bracket carried by said hoop and radiating therefrom and having component portions detachably and adjustably connectable to one rail and a predetermined rung, whereby the chute and said means may be readily adjusted on the ladder to adapt the same to the picker's standing but ever changing positions on the ladder rungs said bracket embodying a U-bend capable of embracing and gripping said one rail, a first arm connecting one limb of the U-bend to said hoop, and a second arm connected with the other limb of the U-bend and terminating in an offset lateral hook connectible with the cooperating rung.

2. In combination, a chute attaching, suspending and locating bracket embodying a U-shaped bend for attachment to a side rail of a fruit picker's ladder, said bend having spaced parallel limbs and a bight portion connecting the limbs together, a chute suspending hoop, a first arm joined at one end to and radiating from the loop and joined at the other end to one of said limbs, a second arm coplanar with the first arm and joined to the other limb, said second arm terminating in a ladder rung engaging and retaining hook, and a fruit-gathering chute having an open upper fruit intake end provided with a hem, said hoop having a free end and being removably threaded into said hem.

3. For use by a fruit picker while standing on the rungs of a picker's ladder and picking fruit from the limbs of a fruit tree; a fruit gathering and delivering chute comprising a funnel-like downwardly tapering upper section having an open mouth at its top, the cross-sectional diameter of the lower end of said upper section being greater than the size of the fruit which must pass freely therethrough and at least one lower positioned companion section having an upper end joined communicatively to said lower end, said upper section being flexible but inelastic, said lower section being elastic and of a uniform cross-sectional diameter slightly less than the size of the fruit so that it functions to arrest the fall of the fruit from the lower end of the upper section yet allows the fruit to gravitate and descend slowly to and through the bottom discharge end thereof to avoid damaging the fruit.

4. The structure defined in claim 3, and wherein said upper section comprises an open end duck tube, said lower section comprising an elastic tube.

5. The structure defined in claim 3 and, in combination, means for rigidifying and keeping said intake mouth open and attaching said chute to a picker's ladder embodying a rigid hoop from which said chute is hung and suspended, and length-adjusting straps detachably fastened lengthwise in said upper section, the upper ends of said straps being adjustably connectible to fasteners provided therefor on said upper end in a manner to be shortened or lengthened as needed.

6. A fruit picker's fruit gathering and delivering chute having a funnel-like upper inelastic section with an endless annular hem at the top, attaching means detachably and adjustably connectible to a ladder and having a supporting hoop encased and confined in said hem, said hem having exterior circumferentially spaced strap-end anchoring fasteners, and a plurality of longitudinal adjusting straps on the interior of said section detachably connected by quick-separable fasteners to said first named fasteners, said straps being located and secured at equidistant circumferentially spaced points to said interior, the upper detachable ends of said straps being releasable from the quick-separable fasteners and adjustably connectible with the anchoring fasteners provided therefor on said hoop.

7. An attachment for fruit picker's ladder comprising, in combination, a collapsible open-ended canvas fruit gathering and gravitating chute tapering downwardly and having an upper fruit intake end provided with a hem and a restricted lower discharge end, suspension means for said chute embodying a rigid hoop provided on one side with a radially extending arm, said arm provided at an attachable end for detachably and adjustably connecting the same with intended component parts of the aforementioned ladder, said hoop being enclosed in and rigidifying said hem, and a plurality of chute adjusting straps arranged longitudinally on the interior of said chute, said straps being located at equi-distant circumferentially spaced points and having longitudinally spaced portions thereof detachably and adjustably connected with fasteners provided therefor on said interior surface, the upper ends of said straps being detachably and adjustably connectible to the fasteners provided therefor on said rigidified hem in a manner permitting the chute to be selectively and adjustably shortened.

References Cited in the file of this patent

UNITED STATES PATENTS

| | | |
|---|---|---|
| 670,940 | Schieder | Apr. 2, 1901 |
| 976,871 | Hammond | Nov. 29, 1910 |
| 982,604 | Herring | Jan. 24, 1911 |
| 1,114,318 | Vasey | Oct. 20, 1914 |
| 1,309,119 | Dillon | July 8, 1919 |
| 1,680,925 | Wood | Aug. 14, 1928 |
| 2,873,937 | Oldenberg | Feb. 17, 1959 |